United States Patent
Ito

(10) Patent No.: US 10,940,797 B2
(45) Date of Patent: Mar. 9, 2021

(54) OBSTACLE DETECTING AND NOTIFYING DEVICE, METHOD, AND COMPUTER PROGRAM PRODUCT

(71) Applicant: AISIN SEIKI KABUSHIKI KAISHA, Kariya (JP)

(72) Inventor: Kota Ito, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/604,315

(22) PCT Filed: Mar. 6, 2018

(86) PCT No.: PCT/JP2018/008640
§ 371 (c)(1),
(2) Date: Oct. 10, 2019

(87) PCT Pub. No.: WO2018/190037
PCT Pub. Date: Oct. 18, 2018

(65) Prior Publication Data
US 2020/0114820 A1 Apr. 16, 2020

(30) Foreign Application Priority Data
Apr. 12, 2017 (JP) .............................. JP2017-079192

(51) Int. Cl.
*G08G 1/16* (2006.01)
*B60Q 9/00* (2006.01)
(Continued)

(52) U.S. Cl.
CPC ............ *B60Q 9/008* (2013.01); *G01S 15/931* (2013.01); *G08G 1/04* (2013.01); *G08G 1/056* (2013.01);
(Continued)

(58) Field of Classification Search
CPC . B60Q 9/008; G01S 15/931; G01S 2015/932; G08G 1/04; G08G 1/056; G08G 1/166
See application file for complete search history.

(56) References Cited

U.S. PATENT DOCUMENTS

| 7,741,961 B1 * | 6/2010 | Rafii | B60Q 9/005 340/435 |
| 8,421,859 B2 * | 4/2013 | Zhang | B60W 30/09 340/988 |

(Continued)

FOREIGN PATENT DOCUMENTS

| JP | 5150527 B2 | 2/2013 |
| JP | 2015-032028 A | 2/2015 |

(Continued)

OTHER PUBLICATIONS

International Search Report for PCT/JP2018/008640 dated Jun. 12, 2018 [PCT/ISA/210].

*Primary Examiner* — Nay Tun
(74) *Attorney, Agent, or Firm* — Sughrue Mion, PLLC

(57) ABSTRACT

An obstacle detecting and notifying device according to an embodiment is to be installed in a vehicle, to issue an alarm upon detecting a moving obstacle. The device includes a moving-obstacle detector that detects a moving obstacle in a given monitoring area; a first calculator that calculates an expected moving route of the moving obstacle; a second calculator that calculates an expected moving route of the vehicle; a setter that sets an alarm area in the monitoring area in accordance with the expected moving route of the vehicle, the alarm area in which the alarm is to be issued; an excluder that excludes, from alarming moving obstacles, the moving obstacle unlikely to reach the alarm area, in accordance with the expected moving route of the moving obstacle and the
(Continued)

expected moving route of the vehicle; and an alarm that issues an alarm against the alarming moving obstacles.

6 Claims, 6 Drawing Sheets

(51) Int. Cl.
    *G01S 15/931*      (2020.01)
    *G08G 1/04*      (2006.01)
    *G08G 1/056*      (2006.01)

(52) U.S. Cl.
    CPC ........ *G08G 1/166* (2013.01); *G01S 2015/932* (2013.01)

(56) References Cited

U.S. PATENT DOCUMENTS

| | | | | |
|---|---|---|---|---|
| 8,577,552 B1* | 11/2013 | Smit | ............ | G01S 13/931 701/41 |
| 8,674,819 B2* | 3/2014 | Ito | ............ | B60Q 9/008 340/435 |
| 8,676,431 B1* | 3/2014 | Mariet | ............ | G05D 1/0238 701/28 |
| 8,872,919 B2* | 10/2014 | Watanabe | ............ | B60R 1/00 348/148 |
| 9,098,752 B2* | 8/2015 | Huntzicker | ............ | B60Q 9/008 |
| 9,227,604 B2* | 1/2016 | Sugano | ............ | G01S 7/4816 |
| 9,505,346 B1* | 11/2016 | Yamada | ............ | B60Q 9/008 |
| 9,505,413 B2* | 11/2016 | Laine | ............ | G08G 1/165 |
| 9,862,416 B2* | 1/2018 | Imai | ............ | G08G 1/166 |
| 10,026,321 B2* | 7/2018 | Prasad | ............ | G08G 1/0129 |
| 10,055,652 B2* | 8/2018 | Myers | ............ | B60R 1/00 |
| 10,202,135 B2* | 2/2019 | Mian | ............ | G08G 1/0175 |
| 10,429,850 B2* | 10/2019 | Kato | ............ | G05D 1/0231 |
| 10,479,274 B2* | 11/2019 | Park | ............ | B60R 1/00 |
| 10,589,673 B2* | 3/2020 | Morimura | ............ | G06K 9/00362 |
| 2003/0069695 A1* | 4/2003 | Imanishi | ............ | G08G 1/166 701/301 |
| 2008/0042812 A1* | 2/2008 | Dunsmoir | ............ | G06K 9/00818 340/435 |
| 2008/0205706 A1* | 8/2008 | Hongo | ............ | H04N 7/183 382/104 |
| 2008/0211644 A1* | 9/2008 | Buckley | ............ | G08G 1/166 340/435 |
| 2010/0201509 A1* | 8/2010 | Hara | ............ | G08G 1/166 340/435 |
| 2013/0235201 A1* | 9/2013 | Kiyohara | ............ | G06T 7/20 348/148 |
| 2014/0055614 A1* | 2/2014 | Kahan | ............ | G08G 1/166 348/148 |
| 2016/0272244 A1* | 9/2016 | Imai | ............ | G08G 1/166 |
| 2016/0325676 A1* | 11/2016 | Yamada | ............ | G06K 9/00805 |
| 2016/0342850 A1* | 11/2016 | Elimalech | ............ | H04N 7/183 |
| 2017/0213459 A1* | 7/2017 | Ogaz | ............ | G08G 1/166 |
| 2018/0099665 A1* | 4/2018 | You | ............ | B60W 30/0953 |
| 2018/0253595 A1* | 9/2018 | Aoki | ............ | G06K 9/00348 |
| 2018/0370529 A1* | 12/2018 | Matsunaga | ............ | B60W 30/095 |

FOREIGN PATENT DOCUMENTS

| | | | |
|---|---|---|---|
| JP | 2015032028 A | * | 2/2015 |
| JP | 2015-081022 A | | 4/2015 |

* cited by examiner

OBSTACLE DETECTING AND NOTIFYING DEVICE, METHOD, AND COMPUTER PROGRAM PRODUCT

CROSS-REFERENCE TO RELATED APPLICATIONS

This application is a national stage application of International Application No. PCT/JP2018/008640, filed Mar. 6, 2018, which designates the United States, incorporated herein by reference, and which claims the benefit of priority from Japanese Patent Application No. 2017-079192, filed Apr. 12, 2017, the entire contents of which are incorporated herein by reference.

TECHNICAL FIELD

Embodiments of the present invention generally relate to an obstacle detecting and notifying device, method, and computer program product.

BACKGROUND ART

A driver assistance technology in vehicle driving is proposed, which detects an obstacle around the vehicle from image data of the surroundings generated by a plurality of cameras installed in the vehicle to notify the driver of the obstacle.

A known technique is, for example, for detecting a moving object from around the vehicle as a moving obstacle to issue an alarm, or for detecting obstacles such as a level difference of a road shoulder, a guardrail, or a wall to issue an alarm (see Patent Literature 1, for example).

CITATION LIST

Patent Literature

Patent Document 1: Japanese Patent No. 5150527

SUMMARY OF INVENTION

Problem to be Solved by the Invention

In reality, however, such a technique may detect and issue an alarm against a moving obstacle which will not possibly enter an expected travel route of the vehicle because of an obstacle, such as a wall or a guardrail, located between the vehicle and the moving obstacle. In such a case, frequent issuances of alarm may annoy the driver.

Thus, there are demands for avoiding issuance of alarm against moving obstacles which are unlikely to enter the expected travel route of a vehicle and have no possibility of collision.

Means for Solving Problem

In view of solving the above problem, according to one embodiment, an obstacle detecting and notifying device is to be installed in a vehicle, to issue an alarm upon detecting a moving obstacle. The device includes a moving-obstacle detector that detects a moving obstacle in a given monitoring area; a first calculator that calculates an expected moving route of the moving obstacle; a second calculator that calculates an expected moving route of a vehicle; a setter that sets an alarm area in the monitoring area in accordance with the expected moving route of the vehicle, the alarm area in which the alarm is to be issued; an excluder that excludes, from alarming moving obstacles, the moving obstacle unlikely to reach the alarm area, in accordance with the expected moving route of the moving obstacle and the expected moving route of the vehicle; and an alarm that issues an alarm against the alarming moving obstacles.

The obstacle detecting and notifying device as configured above excludes a moving obstacle which is located in a given monitoring area but unlikely to reach an alarm area, from alarming moving obstacles. Thus, the obstacle detecting and notifying device can avoid frequently issuing alarms and ensure issuance of necessary alarms.

In the obstacle detecting and notifying device according to one embodiment, the second calculator may calculate a moving route of the vehicle to an expected parking position as the expected moving route of the vehicle.

The obstacle detecting and notifying device as configured above does not issue unnecessary alarms during parking, which enables the driver to focus on driving operation for parking.

In the obstacle detecting and notifying device according to one embodiment, the second calculator may calculate, as the expected moving route of the vehicle, a guide path for the vehicle in parking assistance.

The obstacle detecting and notifying device as configured above does not issue unnecessary alarms during parking assistance, which enables the driver to park the vehicle smoothly with no interruption of the operation of the vehicle under parking assistance.

In the obstacle detecting and notifying device according to one embodiment, the excluder determines that the moving obstacle is unlikely to reach the alarm area, when the expected moving route of the moving obstacle does not intersect the alarm area.

The obstacle detecting and notifying device as configured above issues no alarm in a situation that the vehicle is unlikely to collide with a moving obstacle.

The obstacle detecting and notifying device according to one embodiment may include a vehicle-motion restricting-object detector that detects a vehicle-motion restricting object restricting the vehicle from moving, on the expected moving route of the vehicle in a moving direction; and a corrector that, in response to detection of the vehicle-motion restricting object, corrects the alarm area to exclude an area, the area being apart from a position of the vehicle-motion restricting object by a given distance or more on the expected moving route of the vehicle in the moving direction.

The obstacle detecting and notifying device as configured above can avoid issuing an alarm against a moving obstacle located ahead a vehicle-motion restricting object in the moving direction, avoid frequent alarm issuance, and ensure issuance of necessary alarms.

A method is to be executed by an obstacle detecting and notifying device to be installed in a vehicle, to issue an alarm upon detecting a moving obstacle. The method includes detecting a moving obstacle in a given monitoring area; calculating an expected moving route of the moving obstacle; calculating an expected moving route of the vehicle; setting an alarm area in the monitoring area in accordance with the expected moving route of the vehicle, the alarm area in which the alarm is to be issued; excluding, from alarming moving obstacles, the moving obstacle unlikely to reach the alarm area, in accordance with the expected moving route of the moving obstacle and the expected moving route of the vehicle; and issuing an alarm against the alarming moving obstacles.

By the method as configured above, the obstacle detecting and notifying device excludes a moving obstacle which is located in a given monitoring area but unlikely to reach an alarm area, from alarming moving obstacles. Thus, it is made possible to avoid frequently issuing alarms and ensure issuance of necessary alarms.

According to one embodiment, a computer program product includes programmed instructions embodied in and stored on a non-transitory computer readable medium, wherein the instructions, when executed by a computer, cause the computer to control an obstacle detecting and notifying device installed in a vehicle, to issue an alarm upon detecting a moving obstacle. The instructions cause the computer to perform: detecting a moving obstacle in a given monitoring area; calculating an expected moving route of the moving obstacle; calculating an expected moving route of the vehicle; setting an alarm area in the monitoring area in accordance with the expected moving route of the vehicle, the alarm area in which the alarm is to be issued; excluding, from alarming moving obstacles, the moving obstacle unlikely to reach the alarm area, in accordance with the expected moving route of the moving obstacle and the expected moving route of the vehicle; and issuing an alarm against the alarming moving obstacles.

By the computer program as configured above, a moving obstacle, which is located in a given monitoring area but unlikely to reach an alarm area, is excluded from alarming moving obstacles. Thus, it is made possible to avoid frequently issuing alarms and ensure issuance of necessary alarms.

DESCRIPTION OF EMBODIMENTS

Hereinafter, exemplary embodiments of the present invention are disclosed. Configurations of the embodiments below, and operations, results, and effects attained by the configurations are merely exemplary. The present invention can be implemented by configurations other than the configurations disclosed in the following embodiment, and can attain at least one of various effects based on the basic configurations and derivative effects.

In the present embodiment a vehicle 1 may be, for example, an automobile including an internal combustion engine (not illustrated) as a driving source, i.e., internal combustion engine automobile, or may be a vehicle including an electric motor (not illustrated) as a driving source, i.e., electric vehicle or fuel cell vehicle, may be a hybrid automobile including both of them as a driving source or an automobile including another driving source.

The vehicle 1 can incorporate a variety of transmissions and a variety of devices such as systems and parts or components necessary for driving the internal combustion engine or electric motor, for example. Systems, numbers, and layout of the devices involving driving of wheels 3 of the vehicle 1 can be variously set.

Figure 1:
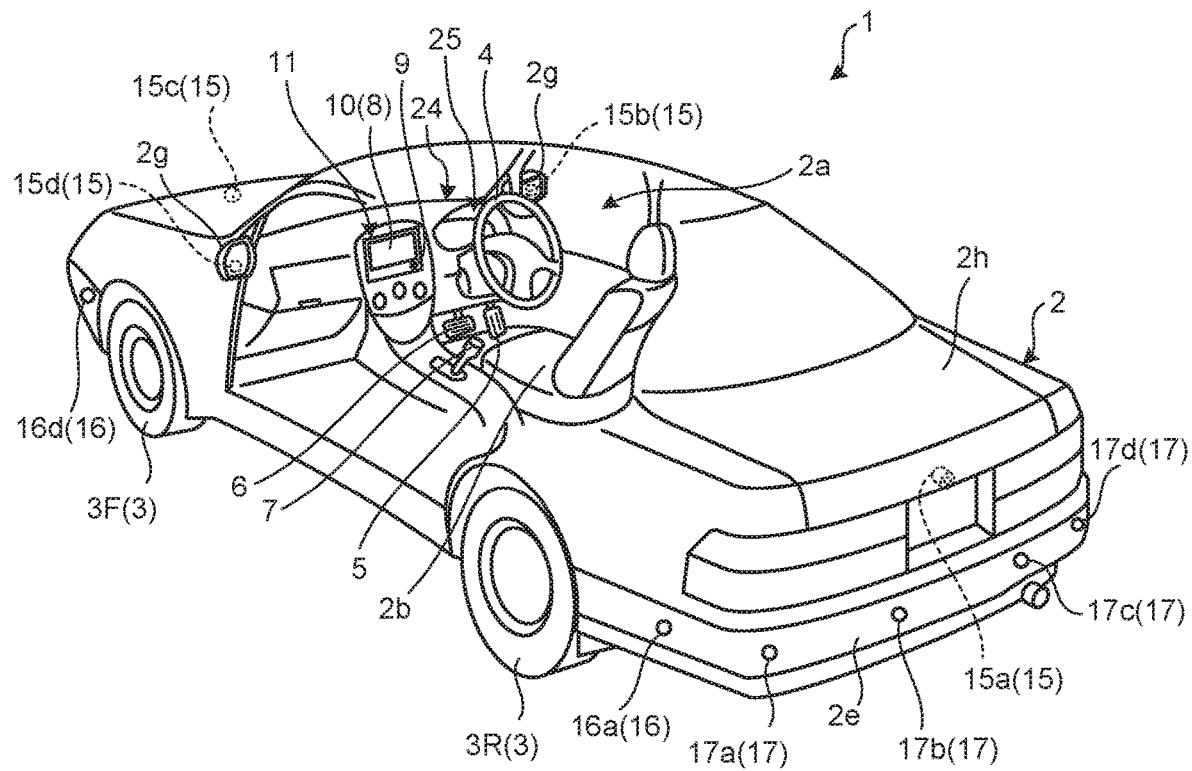
FIG. 1 is an exemplary perspective view of the interior of a vehicle partially transparent in an embodiment.

FIG. 1 is an exemplary perspective view of the interior of a vehicle partially transparent in the embodiment.

Figure 2:
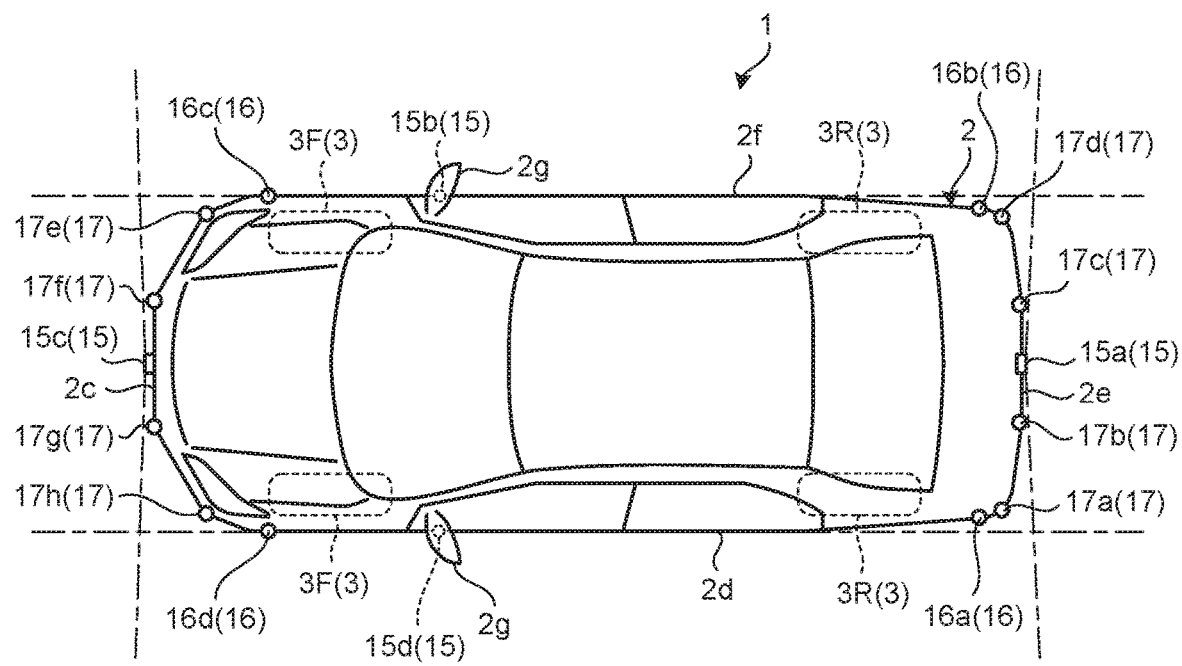
FIG. 2 is an exemplary planar view (overhead view) of a vehicle according to the embodiment.

FIG. 2 is an exemplary planar view (overhead view) of a vehicle according to the embodiment.

As illustrated in FIG. 1, a vehicle body 2 of the vehicle 1 defines a vehicle interior 2a in which an occupant (not illustrated) rides. A steering 4, an acceleration operator 5, a brake operator 6, and a transmission operator 7 are placed inside the vehicle interior 2a, facing a seat 2b of a driver as the occupant.

The steering 4 is, for example, a steering wheel that protrudes from a dashboard 24.

The acceleration operator 5 is, for example, an accelerator pedal located at a driver's foot.

The brake operator 6 is, for example, a brake pedal located at the driver's foot.

The transmission operator 7 is, for example, a shift lever that protrudes from a center console.

The steering 4, the acceleration operator 5, the brake operator 6, and the transmission operator 7 are not limited to such examples.

A display device 8 as a display output and an audio output device 9 as an audio output are installed in the vehicle interior 2a.

The display device 8 is, for example, a liquid crystal display (LCD) or an organic electroluminescent display (OELD).

The display device 8 is covered by a transparent operation input 10 such as a touch panel, for example.

The occupant can view images displayed on the screen of the display device 8 through the operation input 10. For operational inputs, the occupant can touch, push, or move the operation input 10 at a position corresponding to the image displayed on the screen of the display device 8 with his or her finger, for example.

The audio output device 9 is, for example, a speaker.

The display device 8, the audio output device 9, and the operation input 10 are included in a monitor device 11 located at a vehicle-width center, i.e., a horizontal center of the dashboard 2.

The monitor device 11 can include an operation input (not illustrated), such as a switch, a dial, a joystick, and a pushbutton. Another audio output device 9 (not illustrated) can be placed in another location in the vehicle interior 2a different from the monitor device 11. The audio output device 9 of the monitor device 11 and another audio output device can output audio. The monitor device 11 may double as a navigation system and an audio system, for example.

Another display device 12 (see FIG. 3) different from the display device 8 is placed in the vehicle interior 2a.

Figure 3:
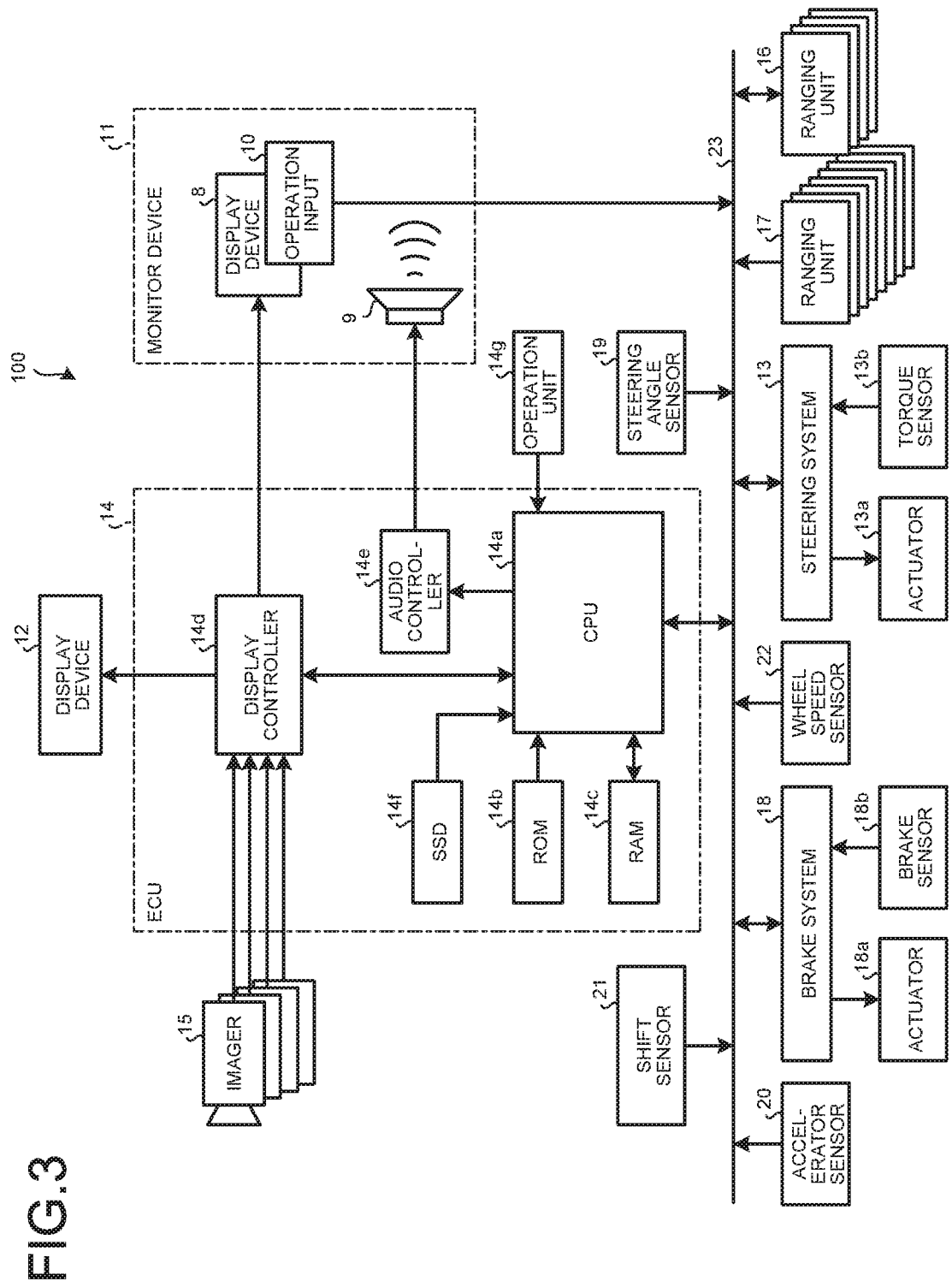
FIG. 3 is an exemplary block diagram of a configuration of a parking assistance system according to the embodiment.

FIG. 3 is an exemplary block diagram of a configuration of a parking assistance system according to the embodiment.

As illustrated in FIG. 3, the vehicle 1 includes a steering system 13 which steers at least two wheels 3 (front wheels 3F and rear wheels 3R). The steering system 13 includes an actuator 13a and a torque sensor 13b. The steering system 13 is electrically controlled by, for example, an electronic control unit (ECU) 14 to thereby operate the actuator 13a. The steering system 13 is configured as, for example, an electric power steering system or a steer-by-wire (SBW) system. The steering system 13 uses the actuator 13a to add torque, i.e., assist torque, to the steering 4 for aiding a steering force or uses the actuator 13a to steer the wheels 3. In this case, the actuator 13a may steer one wheel 3 or two or more wheels 3.

The torque sensor 13b detects, for example, torque applied by the driver to the steering 4.

As illustrated in FIG. 2, the vehicle body 2 is provided with, for example, four imagers 15a to 15d as a plurality of imagers 15. The imagers 15 are, for example, digital cameras that incorporate an image sensor, such as a charge coupled device (CCD) or a CMOS image sensor (CIS). The imagers 15 can output moving image data at a given frame rate. The imagers 15 each include a wide-angle lens or a fisheye lens and can image a horizontal range of, for example, 140 degrees to 190 degrees. The imagers 15 have an obliquely downward optical axis. Thus, the imagers 15 sequentially generate images of an ambient environment around the vehicle body 2 including a road surface on which the vehicle 1 is movable and a parkable area of the vehicle 1, and output image data.

The imager 15a is located, for example, at a rear end 2e of the vehicle body 2 on a wall below a door 2h of a rear trunk. The imager 15b is located at a right end 2f of the vehicle body 2, for example, on a right-side side mirror 2g. The imager 15c is located, for example, on the front side of the vehicle body 2, i.e., at a front end 2c in a vehicle lengthwise direction, for example, at a front bumper. The imager 15d is located, for example, on the left side of the vehicle body 2, i.e., on a left end 2d in the vehicle width direction at a side mirror 2g being a left-side protrusion.

The ECU 14 performs computation and image processing to the image data generated by the imagers 15 to be able to generate an image with a wider viewing angle and a virtual overhead image of the vehicle 1 viewed from above. The overhead image may be referred to as a planar image.

The ECU 14 also identifies from the images of the imagers 15 parking lines drawn on the road surface around the vehicle 1 to thereby detect (extract) a parking lot indicated by the parking lines.

As illustrated in FIGS. 1 and 2, the vehicle body 2 is provided with, for example, four ranging units 16a to 16d and eight ranging units 17a to 17h, as a plurality of ranging units 16 and 17. The ranging units 16 and 17 are, for example, sonars that emit ultrasonic waves and detect reflected waves thereof. The sonar may be referred to as a sonar sensor or an ultrasonic wave detector. The ECU 14 can determine, from results of the detection from the ranging units 16 and 17, presence or absence of an object such as an obstacle located around the vehicle 1 and measures a distance to the object. The ranging units 16 and 17 are an exemplary detector that detects an object.

In this case, the ranging units 17 are used in detecting, for example, an object in a relatively short distance and the ranging units 16 are used in detecting, for example, an object in a relatively longer distance than the ranging units 17. The ranging units 17 are used in detecting, for example, an object ahead and behind the vehicle 1 and the ranging units 16 are used in detecting an object lateral to the vehicle 1.

In a parking assistance system 100, as illustrated in FIG. 3, a brake system 18, a steering angle sensor 19, an accelerator sensor 20, a shift sensor 21, and a wheel speed sensor 22 are electrically connected to one another via an in-vehicle network 23 as an electrical communication line, in addition to the ECU 14, the monitor device 11, the steering system 13, and the ranging units 16 and 17.

The in-vehicle network 23 is configured as a controller area network (CAN), for example.

As configured above, the ECU 14 can control the steering system 13 and the brake system 18 and other elements by transmitting a control signal via the in-vehicle network 23. The ECU 14 can receive, via the in-vehicle network 23, operation signals of the operation input 10 and results of the detection of the torque sensor 13b, a brake sensor 18b, a steering angle sensor 19, the ranging units 16, the ranging units 17, the accelerator sensor 20, the shift sensor 21, and the wheel speed sensor 22.

The ECU 14 includes, for example, a central processing unit 14a (CPU), a read only memory 14b (ROM), a random access memory 14c (RAM), a display controller 14d, an audio controller 14e, a solid state drive 14f (SSD, flash memory), and an operation unit 14g to which operational instructions for the ECU 14 are input.

As configured above, the CPU 14a can execute various computations and controls such as image processing to images displayed on the display devices 8 and 12, setting a target moving position of the vehicle 1, calculation of the moving route of the vehicle 1, determining presence or absence of interfering objects, automatic control of the vehicle 1, and cancellation of automatic control.

The CPU 14a can read an installed program from a nonvolatile storage device such as the ROM 14b to execute computation by the program.

The RAM 14c temporarily stores various data to be used in the computation by the CPU 14a.

Of the computation by the ECU 14, the display controller 14d mainly executes image processing to the image data generated by the imagers 15, and synthesizes the image data for display on the display device 8, and so forth.

Of the computation by the ECU 14, the audio controller 14e mainly processes audio data output from the audio output device 9.

The SSD 14f is a rewritable nonvolatile storage and can store data upon power-off of the ECU 14. The CPU 14a, ROM 14b, and RAM 14c may be integrated in the same package.

The ECU 14 may include another logical arithmetic processor such as a digital signal processor (DSP) or a logic circuit, instead of the CPU 14a. The SSD 14f may be replaced with a hard disk drive (HDD). The SSD 14f and HDD may be separated from the ECU 14.

The brake system 18 is configured as, for example, an anti-lock brake system (ABS) that prevents the brake from locking, an electronic stability control (ESC) that prevents the vehicle 1 from skidding during cornering, an electric brake system that boosts a braking force (provides brake assistance), or a brake-by-wire (BBW).

The brake system 18 applies a braking force to the wheels 3 and the vehicle 1 via an actuator 18a. The brake system 18 can perform various types of control including traction control, vehicle stabilization control, and anti-skidding control by detecting brake lockup, idling of the wheels 3, and an indication of skidding from a difference in rotational speed between the right and left wheels 3.

A brake sensor 18b is a sensor that detects the position of a movable part of the brake operator 6, for example. The brake sensor 18b can detect the position of a brake pedal being the movable part of the brake operator 6. The brake sensor 18b includes a displacement sensor.

The steering angle sensor 19 is a sensor that detects a steering amount of the steering 4 such as a steering wheel, for example. The steering angle sensor 19 includes a Hall element, for example. The ECU 14 acquires the amount of the driver's steering of the steering 4 and the steering amount of each wheel 3 in automatic steering from the steering angle sensor 19 for various types of control. The steering angle sensor 19 detects the angle of rotation of a rotational part of the steering 4. The steering angle sensor 19 is an exemplary angle sensor.

The accelerator sensor 20 is a sensor that detects the position of a movable part of the acceleration operator 5, for example. The accelerator sensor 20 can detect the position of the accelerator pedal as the movable part of the acceleration operator 5. The accelerator sensor 20 includes a displacement sensor.

The shift sensor 21 is a sensor that detects the position of a movable part of the transmission operator 7, for example. The shift sensor 21 can detect the position of a lever, an arm, or a button of the transmission operator 7 as the movable part. The shift sensor 21 may include a displacement sensor and may be formed as a switch.

The wheel speed sensor 22 is a sensor that detects the amount of rotation or rotation speed per unit time of the wheels 3. The wheel speed sensor 22 outputs the number of wheel speed pulses indicating a detected rotation speed, as a sensor value. The wheel speed sensor 22 can include a Hall element, for example. The ECU 14 acquires the sensor value from the wheel speed sensor 22 and computes the moving amount of the vehicle 1 from the sensor value for various kinds of control. The wheel speed sensor 22 may be included in the brake system 18. In this case, the ECU 14 acquires results of the detection from the wheel speed sensor 22 via the brake system 18.

The configurations, arrangement, and electrical connection of the various sensors and actuators are merely exemplary and can be set (modified) variously.

The following will describe the operation of the embodiment.

First Embodiment

A first embodiment will describe operations at the time of guiding the vehicle forward and parking the vehicle backward in juxtaposition, by way of example.

Figure 4:
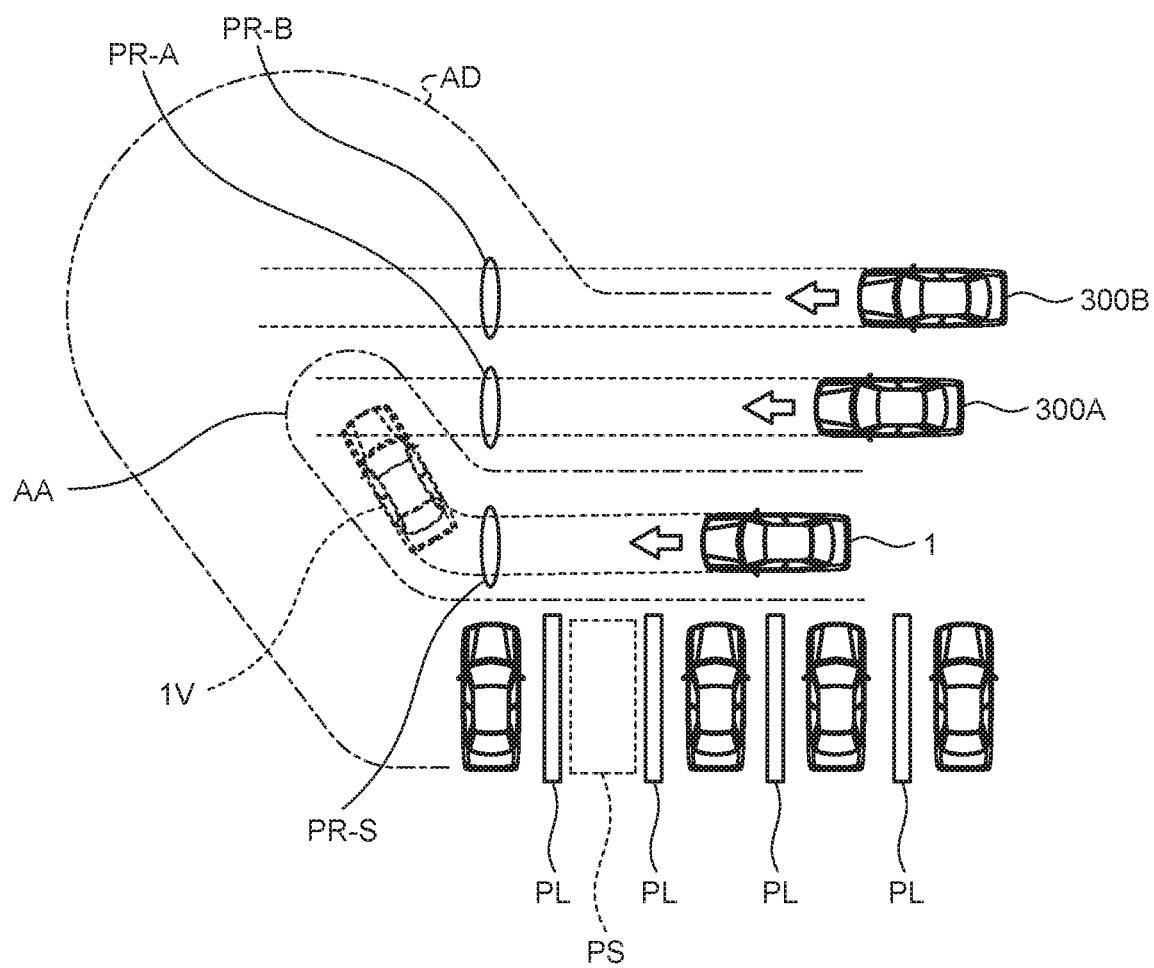
FIG. 4 is an explanatory view of operational states according to a first embodiment.

FIG. 4 is an explanatory view of operational states according to the first embodiment.

Figure 5:
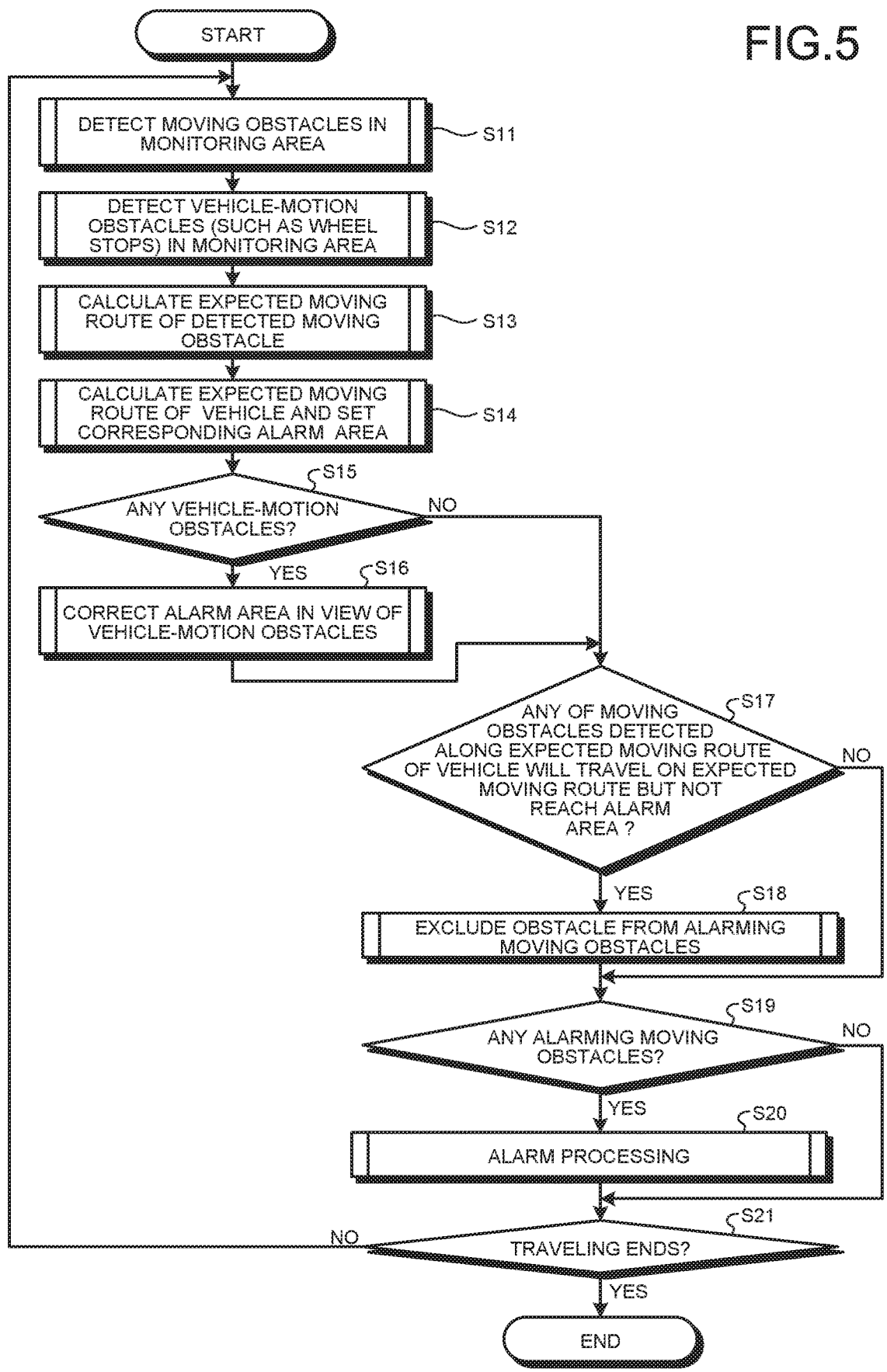
FIG. 5 is an operation flowchart according to the embodiment.

FIG. 5 is an operation flowchart according to the embodiment.

The first embodiment describes an example that the vehicle 1a is subjected to parking assistance for parking in a parking space PS sectioned by means of parking lines PL.

First, the ECU 14 of the vehicle 1 detects moving obstacles in a monitoring area AD (indicated by a one-dot-chain line in FIG. 4) with reference to image data generated by the imagers 15 (step S11).

At this point, all the moving obstacles detected from the monitoring area AD are set to alarming moving obstacles. That is, other vehicles 300A and 300B are at least partially contained in the monitoring area AD, and are thus alarming moving obstacles at this point.

In FIG. 4, a vehicle 1V indicated by a dotted line approaches other vehicles most at the position (upper part of FIG. 4) on a guide path set during parking assistance. After reaching this position, the vehicle 1V changes direction and travels backward.

In this case, the monitoring area AD is set to the area around the vehicle position in a given distance from the vehicle, and can be imaged by the imagers 15a to 15d.

Thus, upon estimation that a moving object imaged by the imagers 15a to 15d is located outside the given distance, the ECU 14 does not detect the moving object as a moving obstacle (or alarming moving obstacle).

More specifically, in the example of FIG. 4, moving obstacles, i.e., other vehicles 300A and 300B are running in the monitoring area AD. The ECU 14 detects the two vehicles 300A and 300B as moving obstacles.

Next, the ECU 14 detects a vehicle-motion obstacle, which obstructs the movement (advance) of the vehicle 1, from the monitoring area AD (step S12).

In this case, the vehicle-motion obstacle of the vehicle 1 refers to an obstacle that can actually hinder the movement of the vehicle 1. Examples thereof include wheel stops, guardrails, fences, boundary blocks, and carriageway-sidewalk boundary blocks.

Subsequently, the ECU 14 calculates an expected moving route of the moving obstacle detected in step S11 (step S13).

The expected moving route can be calculated most simply as a linear route from the images generated by the imagers 15a to 15d, upon premise that the moving obstacle is to advance without changing the moving direction. Alternatively, movement trajectory can be calculated from two or more images. In this case, the speed of movement is also detected to estimate the position of the moving obstacle after elapse of a given length of time.

Then, the ECU 14 calculates the expected moving route (in the present embodiment, the expected moving route during parking assistance) of the vehicle 1, and sets an alarm area AA along with the expected moving route (step S14).

Herein, the alarm area AA refers to an area where the vehicle 1 may possibly collide with a moving obstacle if it actually enters the area. Thus, the alarm area AA is set for issuing an alarm to call the driver's attention to a moving obstacle beforehand, when the moving obstacle is expected to enter the alarm area AA. That is, if the expected moving route of the moving obstacle calculated in step S13 intersects the alarm area AA, the ECU 14 will issue an alarm.

The ECU 14 determines whether or not there is a vehicle-motion obstacle in the traveling direction of the vehicle 1 from the expected moving route of the vehicle 1 calculated in step S14 (step S15).

In the example in FIG. 4, there is no vehicle-motion obstacle in the traveling direction of the vehicle 1 (NO in step S15). The ECU 14 then determines whether or not any of the moving obstacles (other vehicles 300A and 300B in the example in FIG. 4), detected along the expected moving route of the vehicle 1, travels on the expected moving route but does not reach (or unlikely to reach) the alarm area AA (step S17).

After determining in step S17 that all the detected moving obstacle will reach the alarm area AA along the expected moving route (NO in step S17), the ECU 14 proceeds to step S19 as described later.

After determining in step S17 that any of the detected moving obstacles will not reach the alarm area AA along the expected moving route (YES in step S17), the ECU 14 excludes the moving obstacle or obstacles not reaching the alarm area AA from the alarming moving obstacles (step S18).

Specifically, in the example in FIG. 4, another vehicle 300B will not reach the alarm area AA along an expected moving route PR-B and is therefore excluded from the alarming moving obstacles. However, another vehicle 300A will reach the alarm area AA along an expected moving route PR-A and therefore remains as an alarming moving obstacle.

Subsequently, the ECU 14 performs alarm processing to notify the driver of the alarming moving obstacle, among the detected moving obstacles, which will reach the alarm area AA if it moves along the expected moving route (step S20).

Examples of alarm processing may include outputting an alarm signal by voice or displaying an alarm on a meter-panel display 25.

The ECU 14 then determines whether or not the vehicle has stopped traveling (step S21).

After determining in step S21 that the vehicle has not stopped traveling, that is, that the vehicle 1 is continuously moving to reach the parking space PS (NO in step S21), the ECU 14 returns to step S11 and repeats the foregoing processing.

After determining in step S21 that the vehicle has stopped traveling (YES in step S21), the ECU 14 ends the processing.

According to the first embodiment, as illustrated above, in the case of guiding the vehicle forward and parking the vehicle backward in a parking space in juxtaposition, the ECU 14 determines a moving obstacle (more specifically, another vehicle 300B) located in the monitoring area AD as unlikely to collide with the vehicle 1, if the moving obstacle will not reach the alarm area AA set along the expected moving route or the guide path of the vehicle 1. The ECU 14 then excludes the moving obstacle from the alarming moving obstacles. Thus, the ECU 14 refrains from issuing an alarm against the moving obstacle located in the monitoring area AD, which can abate driver's annoyance.

Second Embodiment

A second embodiment will describe operations in the case of parking the vehicle backward in a parking space in juxtaposition, by way of example.

Operations of the second embodiment will be described, referring to the operation flowchart of FIG. 5.

Figure 6:
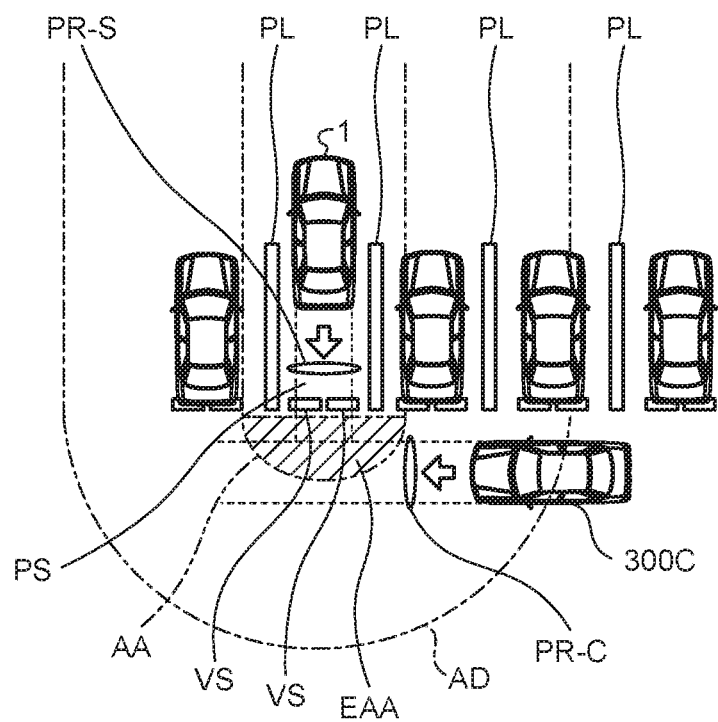
FIG. 6 is an explanatory view of operational states according to a second embodiment.

FIG. 6 is an explanatory view of operational states according to the second embodiment.

The second embodiment describes an example that the vehicle 1 is going to park in the parking space PS.

First, the ECU 14 of vehicle 1 detects moving obstacles in the monitoring area AD (indicated by a one-dot-chain line in FIG. 6) with reference to image data generated by the imagers 15 (step S11).

At this point, the ECU 14 considers all the moving obstacles detected from the monitoring area AD to be alarming moving obstacles. That is, another vehicle 300C is at least partially contained in the monitoring area AD, therefore, the ECU 14 considers another vehicle 300C as an alarming moving obstacle at this point.

Then, the ECU 14 detects a vehicle-motion obstacle, which obstructs the movement (advance) of the vehicle 1, from the monitoring area AD (step S12).

In this case, the ECU 14 detects a pair of wheel stops VS as a vehicle-motion obstacle being to obstruct the vehicle 1 from moving in the moving direction (downward in FIG. 6) during parking.

Subsequently, the ECU 14 calculates an expected moving route PR-C of the moving obstacle detected in step S11, that is, another vehicle 300C in the same manner as in the first embodiment (step S13).

The ECU 14 next calculates an expected moving route (in the present embodiment, expected moving route during parking assistance) PR-S of the vehicle 1, and sets an alarm area AA along with the expected moving route PR-S (step S14).

The ECU 14 determines whether or not there is a vehicle-motion obstacle in the traveling direction of the vehicle 1 with reference to the expected moving route PR-S of the vehicle 1 calculated in step S14 (step S15).

In the example in FIG. 6, a pair of wheel stops VS being vehicle-motion obstacles is located in the traveling direction of the vehicle 1 (YES in step S15). Thus, the ECU 14 corrects the alarm area AA according to the locations of the installed vehicle-motion obstacles (step S16).

Figure 7:
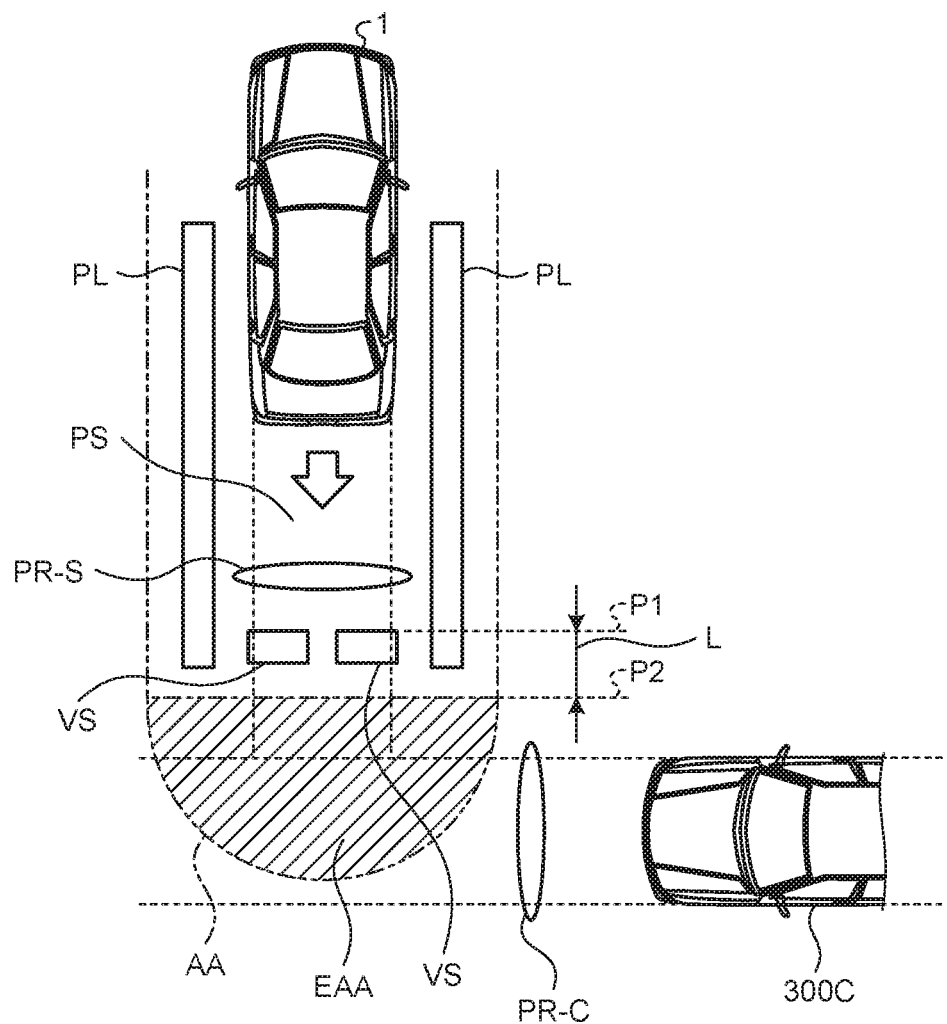
FIG. 7 is an explanatory view of correction processing to the alarm area.

FIG. 7 is an explanatory view of correction processing to the alarm area.

In the example of FIG. 7, the vehicle 1 is assumed to be prevented by the wheel stops VS being vehicle-motion obstacles from moving beyond a position P2 apart by a distance L from a position P1 ahead of the wheel stops VS in the moving direction of the vehicle position, as viewed from the vehicle 1. The ECU 14 corrects the alarm area AA to exclude an area EAA indicated by hatching in FIG. 7 therefrom.

In this case, the distance L is set to the distance that the rear end of the vehicle 1 (the rear bumper, for example) will not reach when the wheels of the vehicle 1 (in the examples of FIGS. 6 and 7, the rear wheels located frontward in the traveling direction) are in contact with the wheel stops VS being vehicle-motion obstacles. Thus, the distance L is suitably set depending on the type of the vehicle 1.

The ECU 14 next determines whether or not any of the moving obstacles (another vehicle 300C in the examples of FIGS. 6 and 7) detected on the expected moving route of the vehicle 1 will not reach (or unlikely to reach) the corrected alarm area AA (step S17).

In the determination in step S17, another vehicle 300C moving along the expected moving route PR-C does not reach the corrected alarm area AA, as illustrated in FIG. 7 (NO in step S17). Thus, the ECU 14 proceeds to step S19, as described later.

After determining in step S17 that one or more detected moving obstacles moving along the expected moving route will not reach the alarm area AA corrected in view of the vehicle-motion obstacles (YES in step S17), the ECU 14 excludes all the moving obstacles, which will not reach the alarm area AA, from the alarming moving obstacles (step S18).

Specifically, in the examples of FIGS. 6 and 7, another vehicle 300C will not reach the alarm area AA and is therefore excluded from the alarming moving obstacles.

That is, in the examples of FIGS. 6 and 7, with no alarming moving obstacles found in step S19 (NO in step S19), the ECU 14 does not perform the alarm processing but determines whether or not the vehicle has stopped traveling (step S21).

After determining in step S21 that the vehicle has not stopped traveling, that is, the vehicle 1 is continuously moving, having not arrived in the parking space PS (NO in step S21), the ECU 14 returns to step S11 and repeats the same processing.

After determining in step S21 that the vehicle has stopped traveling (YES in step S21), the ECU 14 ends the processing.

According to the second embodiment, as illustrated above, for parking the vehicle backward in a parking space in juxtaposition, the ECU 14 excludes, from the alarming moving obstacles, a moving obstacle (specifically, another vehicle 300C) which is located in the monitoring area AD but will not reach the alarm area AA corrected in view of the vehicle-motion obstacles and set in accordance with the expected moving route or the guide path of the vehicle 1, since such a moving obstacle is unlikely to collide with the vehicle. Thus, the ECU 14 does not issue an alarm against a moving obstacle located in the monitoring area AD, which can abate the driver's annoyance due to frequent alarms, which would otherwise occur.

Embodiments of the present invention have been described above for illustrative purpose only and are not intended to limit the scope of the invention. Such novel embodiments may be carried out in a variety of forms, and various omissions, substitutions and modifications can be made without departing from the spirit of the invention. Such embodiments and modifications are incorporated in the scope and spirit of the invention and are incorporated in the scope of the inventions set forth in the claims and their equivalents.

For example, the above embodiments have described the parking assistance system by way of example, however, the embodiments are applicable to a driver assistance system or an autonomous driving system.

The above embodiments have described the example of setting the area EAA ahead of the vehicle 1 in the traveling direction in the alarm area AA. The area EAA can be set laterally relative to the traveling direction.

Alternatively, multiple areas EAA can be set in different directions for exclusion from the alarm area AA.

The above embodiments have described the expected moving routes of a linear form (PR-A, PR-B, and PR-C, for example) of other vehicles by way of example. However, the expected moving routes of a curved form can be set by detecting the locations of other vehicles being moving obstacles multiple times.

The above embodiments have described vehicle-motion restricting objects as an example of objects that restrict the movement of the vehicle. The embodiments are applicable to another vehicle moving toward the vehicle and objects that restrict the movement of another vehicle, by handling the motion-restricting object for another vehicle in the same manner as the vehicle-motion restricting objects.

The invention claimed is:

1. An obstacle detecting and notifying device to be installed in a vehicle, to issue an alarm upon detecting a moving obstacle, the device comprising:
at least one processor configured to implement:
a moving-obstacle detector that detects a moving obstacle in a given monitoring area;
a first calculator that calculates an expected moving route of the moving obstacle;
a second calculator that calculates an expected moving route of the vehicle;
a setter that sets an alarm area in the monitoring area in accordance with the expected moving route of the vehicle, the alarm area in which the alarm is to be issued;
a vehicle-motion restricting-object detector that detects a vehicle-motion restricting object restricting the vehicle from moving, on the expected moving route of the vehicle in a moving direction;
a corrector that, in response to detection of the vehicle-motion restricting object, corrects the alarm area to exclude an area, the area being apart from a position of the vehicle-motion restricting object by a given distance or more on the expected moving route of the vehicle in the moving direction;
an excluder that excludes, from alarming moving obstacles, the moving obstacle unlikely to reach the alarm area corrected by the corrector, in accordance with the expected moving route of the moving obstacle and the expected moving route of the vehicle; and
an alarm that issues an alarm against the alarming moving obstacles.

2. The obstacle detecting and notifying device according to claim 1, wherein the second calculator calculates a moving route of the vehicle to an expected parking position as the expected moving route of the vehicle.

3. The obstacle detecting and notifying device according to claim 2, wherein the second calculator calculates, as the expected moving route of the vehicle, a guide path for the vehicle in parking assistance.

4. The obstacle detecting and notifying device according to claim 1, wherein the excluder determines that the moving obstacle is unlikely to reach the alarm area, when the expected moving route of the moving obstacle does not intersect the alarm area.

5. A method to be executed by an obstacle detecting and notifying device to be installed in a vehicle, to issue an alarm upon detecting a moving obstacle, the method comprising:
detecting a moving obstacle in a given monitoring area;
calculating an expected moving route of the moving obstacle;
calculating an expected moving route of the vehicle;
setting an alarm area in the monitoring area in accordance with the expected moving route of the vehicle, the alarm area in which the alarm is to be issued;
detecting a vehicle-motion restricting object restricting the vehicle from moving, on the expected moving route of the vehicle in a moving direction;
in response to detection of the vehicle-motion restricting object, correcting the alarm area to exclude an area, the area being apart from a position of the vehicle-motion restricting object by a given distance or more on the expected moving route of the vehicle in the moving direction;
excluding, from alarming moving obstacles, the moving obstacle unlikely to reach the corrected alarm area, in accordance with the expected moving route of the moving obstacle and the expected moving route of the vehicle; and
issuing an alarm against the alarming moving obstacles.

6. A computer program product including programmed instructions embodied in and stored on a non-transitory computer readable medium, wherein the instructions, when executed by a computer, cause the computer to control an obstacle detecting and notifying device installed in a vehicle, to issue an alarm upon detecting a moving obstacle, the instructions causing the computer to perform:
detecting a moving obstacle in a given monitoring area;
calculating an expected moving route of the moving obstacle;
calculating an expected moving route of the vehicle;
setting an alarm area in the monitoring area in accordance with the expected moving route of the vehicle, the alarm area in which the alarm is to be issued;
detecting a vehicle-motion restricting object restricting the vehicle from moving, on the expected moving route of the vehicle in a moving direction;
in response to detection of the vehicle-motion restricting object, correcting the alarm area to exclude an area, the area being apart from a position of the vehicle-motion restricting object by a given distance or more on the expected moving route of the vehicle in the moving direction;
excluding, from alarming moving obstacles, the moving obstacle unlikely to reach the corrected alarm area, in accordance with the expected moving route of the moving obstacle and the expected moving route of the vehicle; and
issuing an alarm against the alarming moving obstacles.

* * * * *